Nov. 8, 1966  E. Q. SYLVESTER  3,283,369

APPARATUS FOR AND METHOD OF FORMING CLAD METAL

Filed May 25, 1964

Inventor:
Edmund Q. Sylvester
By Walter S. Schlegel Jr.
Atty.

United States Patent Office 3,283,369
Patented Nov. 8, 1966

1

3,283,369
APPARATUS FOR AND METHOD OF FORMING CLAD METAL
Edmund Q. Sylvester, Shaker Heights, Ohio (% Sylvester Enterprises, Inc., 850 Hanna Bldg., Cleveland, Ohio)
Filed May 25, 1964, Ser. No. 369,883
8 Claims. (Cl. 22—58)

The present invention relates to apparatus for and method of forming clad metal and constituting an improvement over the invention disclosed and claimed in the copending application, Serial No. 374,703, filed June 12, 1964, by Gordon R. Lohman.

The invention relates to a method of producing a clad metal article with the use of a mold in which a cladding metal is first poured into the mold and permitted to freeze at the surface thereof, forming a shell, and the central molten portion is displaced by a core metal in an operation in which all atmosphere is excluded from between the core metal and the shell, and further in which the inner surface of the shell is at least partially molten so that the core metal, when it later freezes, and the shell form a perfect weld or bond.

In the present invention, the core metal is controlled so that the desired proper quantity is introduced into the mold for only displacing the molten cladding metal therein, and not more than that amount, so that the core metal does not proceed into the receptacle into which the molten cladding metal recedes so as to mix with the latter.

A desired method, particularly adapted to the invention, is a pressure pouring method in which the molten cladding metal is forced by increased atmospheric pressure from a ladle upwardly into the mold, and the core metal is introduced into the mold from the top and permitted to lower, and in the lowering step it forces the central molten portion of the cladding metal downwardly into the ladle. If the amount of core metal so introduced into the mold is more than sufficient to fill the shell formed, a portion of it may flow into the ladle and mix with the cladding metal, which is undesirable. If the amount of core metal is less than the desired amount indicated, an imperfect article will be produced.

A broad object of the present invention is to provide in a method of the character indicated, automatic shutting off of the mold and the flow of core metal when the central molten portion of the cladding metal is completely displaced, and not sooner or later than that point.

Another and more specific object of the invention is to provide in a method of the foregoing character, a step of automatically shutting off the mold in the manner just stated, in which a radioactive material is utilized which is picked up by the core metal as the latter is flowing into the mold, and that radioactive material is carried with the mass of core metal introduced into the mold, and means is provided for detecting a signal produced by that radioactive material to automatically shut off the mold when the core metal reaches the end of the mold, which is determined by the presence of that radioactive material.

Other objects and advantages of the invention will appear from the following detailed description taken in conjunction with the accompanying drawings in which.

2

Figure 1:
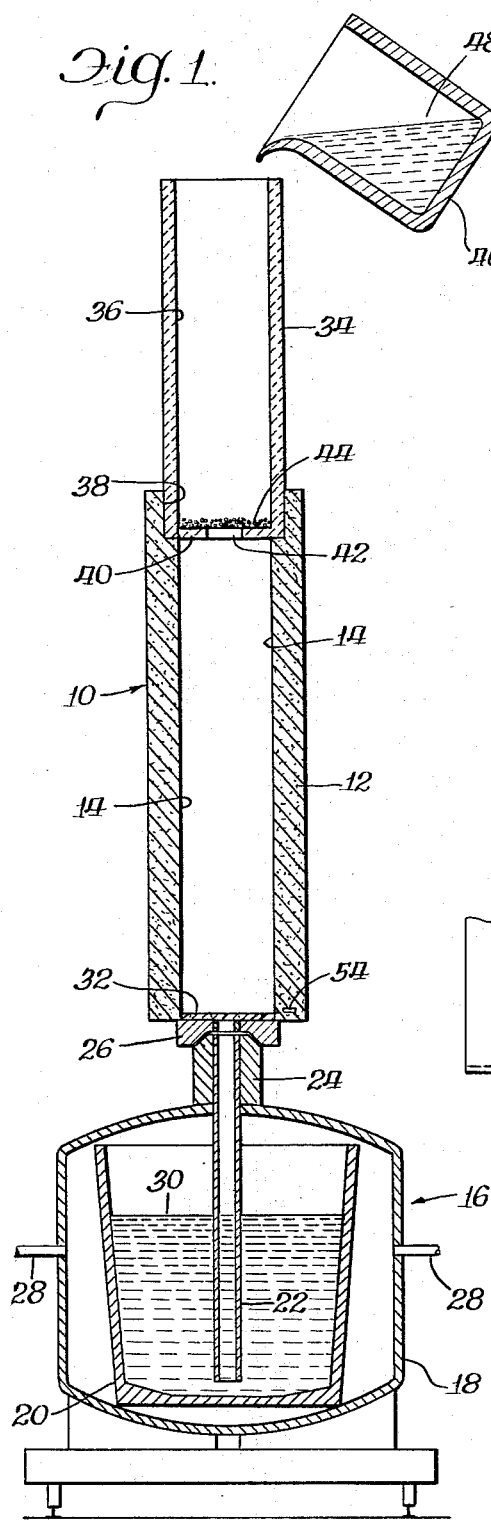
FIGURE 1 is a vertical sectional view of a mold and related apparatus for use in carrying out the method of the invention.

Referring now in detail to the drawings, the apparatus includes a mold indicated in its entirety at 10 into which both the cladding metal and core metal are introduced and in which the resultant clad article is formed. The mold 10 is preferably a graphite mold having a wall 12 defining a central cavity 14 in which the article to be produced is cast. The mold 10 is supported on a lower ladle arrangement indicated in its entirety at 16, which includes a tank 18 having a ladle 20 therein. A pouring tube 22 extends from adjacent the lower end of the ladle upwardly through the tank and through a pouring tube assembly 24 terminating in a top plate 26 directly supporting the mold. The tank 16 is an air-tight tank having inlet and outlet conduits 28 for connection with suitable apparatus (not shown) for producing superatmospheric pressure in the tank and otherwise controlling it. Upon production of the desired atmospheric pressure, the molten metal 30 in the ladle is forced upwardly through the pouring tube into the mold. The metal 30 in the present instance is a cladding metal which may be, for example, stainless steel.

A shut-off slide 32, which may be of known type, is interposed in the bottom of the mold for shutting off the cavity 14 therein from the pouring tube at the desired time, and as described more fully hereinafter.

Supported on the top of the mold 10 is a sleeve 34 which may be of ceramic tile, defining a cavity 36. The sleeve is supported on the mold in a suitable manner such as fitting it in a counterbore 38 therein. The sleeve has a lower closure element 40 provided with a central aperture 42 therein of suitable size which enables flow of metal therethrough at an approximate rate referred to hereinbelow. Placed in the sleeve 34, before pouring any metal thereinto, is a thin layer of radioactive material 44, such as uranium oxide. Although uranium oxide is here designated as an example of radioactive material, other radioactive material may be used in lieu thereof, the purpose being to produce a desired radio signal of suitable strength and in a manner referred to hereinbelow. Suitable means may be utilized for retaining the uranium oxide in the sleeve against accidentally dropping through the aperture, such as a thin wafer, which is quickly melted by the molten metal in the sleeve. A suitable lip pouring ladle 46 may be utilized for containing a quantity of core metal which is poured into the sleeve in the cladding operation.

Figure 2:
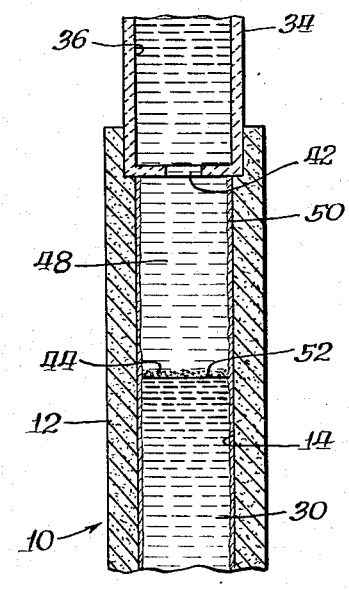
FIGURE 2 is a section of the mold of FIGURE 1 showing an intermediate step in the pouring operation.

In the operation of the apparatus for carrying out the method, superatmospheric pressure is introduced into the sealed tank 18 and the cladding metal 30 is then forced upwardly into the mold as stated above, until the mold is filled up to the lower end of the tile sleeve 34. This pouring operation is then terminated by stopping the introduction of pressure into the tank. The column of metal thus formed in the cavity of the mold is held at that level a suitable time to permit the surface thereof to freeze to form a shell 50 (FIG. 2) which is solid at least to some degree, sufficient to retain its shape, but its inner surface is at least partially molten or soft. The time that this column is so retained in the mold depends upon a number of factors, a principal one of which is the desired thickness of the shell. This time may be a matter of seconds such as 8 or 10 or 12, or more. Then the core metal 48 is poured from the ladle 46 into the tile 34, and it flows down through the aperture 42 into the mold and carries all or a portion of the radioactive material 44 with it. FIGURE 2 represents an intermediate stage of this latter step, the line 52 indicating the plane between the bottom portion of the column which is of cladding metal 30 and the upper portion which is of core metal 48. This operation continues, with the plane 52 lowering, as the step of pouring the core metal 48 continues, until the core metal reaches the shut-off slide 32 at the lower end of the mold cavity.

When the lower end of the column of core metal 48 so reaches the shut-off slide, as just mentioned, the uranium oxide, or at least a portion of it, has also reached that point and is in a position, because of the predetermined adjustments and values of the elements involved, to produce a signal for automatically actuating and shutting off the shut-off slide 32. The elements utilized for producing that operational step include a detection element 54 indicated diagrammatically in FIGURE 1 which receives the signal from the uranium oxide. The uranium oxide is of such strength that the desired signal is capable of passing through the core metal 48 in which the uranium oxide is embedded, and the cladding metal shell 50 of, for example, stainless steel, as well as the graphite of the wall 12 of the mold.

Figure 3:
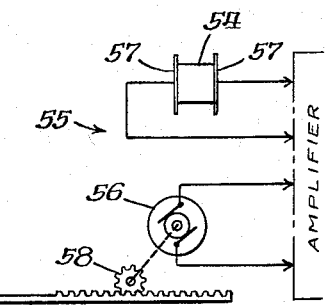
FIGURE 3 is a diagrammatic view of a mold shut-off slide and control means therefor.

Various methods may be used for picking up the radio signals from the uranium oxide for producing the desired operation of closing the shut-off slide. One such detection arrangement, as represented in FIGURE 3, may be a crystal counter 55 of known kind wherein the crystal may be AgCl or LiF. In such a counter, the crystal 54 which constitutes the same detection element 54 embedded in the wall of the mold, is mounted between two metal electrodes 57 connected in a circuit which includes an amplifier. Whenever an ionizing particle passes into the crystal, a pulse of voltage is produced, and electron multiplication takes place as the electrons travel to the positive electrode. The signal pulse produced is transmitted to the amplifier, and the amplified current is utilized for controlling or operating a power device, such as a motor 56 which actuates a pinion 58 working on a rack 60 connected with the shut-off slide 32.

The arrangement for detecting the radio signals from the uranium oxide may be converted into any of various kinds of operation such as hydraulic, pneumatic, electric, etc. Regardless of the specific means for converting the signal into an operational step, the end result of shutting off the mold is accomplished in response to the uranium oxide reaching the lower end of the mold so that the core metal does not flow beyond the mold and down into the ladle where it would mix with the cladding metal.

The core metal 48 may be of any desired kind, such for example as a carbon iron. The iron in the core metal and in the stainless steel form a high affinity for producing the desired perfect weld or bond. Any two materials as desired may be used in the practice of the invention, as is usual in cladding operations, such as a non-corrosion-resistant core metal and a corrosion-resistant cladding metal.

While I have herein disclosed a preferred form of the invention, it will be understood that changes may be made within the scope of the appended claims.

I claim:

1. A method of cladding metal in conjunction with a mold comprising pouring a quantity of cladding metal into the mold and retaining it therein until a first portion thereof freezes, while another portion remains molten, pouring a core metal into the mold and entirely sealing an end of the cladding metal, and displacing the molten metal from the mold and filling the void left thereby with the core metal, whereby to eliminate atmosphere from between the core metal and the cladding metal, and sensing the leading end of the body of core metal poured into the mold as that leading end reaches the far end of the mold, and producing a control signal thereby for automatically effecting shutting off of the mold whereby to prevent flow of the core metal through the mold and mixing with the withdrawn molten portion of the cladding metal.

2. The method set out in claim 1 including the step of introducing a radioactive material in the mold at the leading end of the core metal, and detecting the leading end of the core metal by detecting a signal produced by said radioactive material.

3. The method set out in claim 2 including the further step of detecting a radio signal produced by the radioactive material and amplifying that signal and utilizing it for controlling a power device for shutting off the mold.

4. The method set out in claim 3 including the use of uranium oxide as a radioactive material and a device for amplifying the signal produced by the uranium oxide.

5. The method set out in claim 1 including the further step of pressure pouring the cladding metal into the mold, providing a receptacle above the mold into which the core metal is poured, providing means in the bottom of the receptacle for supporting a quantity of radioactive material, and including the additional step of carrying the radioactive material by the leading end of the core metal as the latter is poured into the mold and progresses through the mold.

6. Apparatus for casting clad metal comprising a mold, means for pouring a cladding metal into the mold from the bottom thereof, means for releasably supporting radioactive material at the top of the mold whereby a core metal upon being poured into the mold carries the radioactive material at its leading end as it progresses through the mold, shut-off means for shutting off the mold at the bottom thereof, and means at the bottom of the mold for detecting signals produced by the radioactive material when the latter reaches the bottom of the mold and operative for amplifying such signal and thereby effecting the shutting off of the shut-off means.

7. The apparatus set out in claim 6 wherein the radioactive material is uranium oxide.

8. The invention set out in claim 6 wherein the detecting means includes a crystal counter and means for amplifying the signal from the radioactive material by the crystal counter.

References Cited by the Examiner
UNITED STATES PATENTS 3,192,581   7/1965   Sylvester _____ 22—60

J. SPENCER OVERHOLSER, *Primary Examiner.*

V. K. RISING, *Assistant Examiner.*